United States Patent
Takiguchi et al.

(10) Patent No.: US 10,259,959 B2
(45) Date of Patent: Apr. 16, 2019

(54) AQUEOUS COATING COMPOSITION

(71) Applicant: Seiko Epson Corporation, Tokyo (JP)

(72) Inventors: Hiroshi Takiguchi, Matsumoto (JP); Akihiko Takano, Shiojiri (JP)

(73) Assignee: Seiko Epson Corporation (JP)

( * ) Notice: Subject to any disclaimer, the term of this patent is extended or adjusted under 35 U.S.C. 154(b) by 11 days.

(21) Appl. No.: 15/664,505

(22) Filed: Jul. 31, 2017

(65) Prior Publication Data

US 2018/0037759 A1  Feb. 8, 2018

(30) Foreign Application Priority Data

Aug. 2, 2016 (JP) ................... 2016-151772

(51) Int. Cl.
*C09D 11/322* (2014.01)
*C09D 11/12* (2006.01)
*C09D 11/037* (2014.01)
*C09D 11/108* (2014.01)
*C09D 11/033* (2014.01)
*C09D 7/62* (2018.01)
*C09D 7/40* (2018.01)
*C08K 3/08* (2006.01)

(52) U.S. Cl.
CPC .............. *C09D 11/322* (2013.01); *C09D 7/62* (2018.01); *C09D 7/70* (2018.01); *C09D 11/033* (2013.01); *C09D 11/037* (2013.01); *C09D 11/108* (2013.01); *C09D 11/12* (2013.01); *C08K 2003/0812* (2013.01)

(58) Field of Classification Search
CPC ... C09D 11/033; C09D 11/037; C09D 11/108; C09D 11/12; C09D 11/322
See application file for complete search history.

(56) References Cited

U.S. PATENT DOCUMENTS

| | | |
|---|---|---|
| 2008/0081864 A1 | 4/2008 | Takano |
| 2010/0269733 A1* | 10/2010 | Kremitzl ............... B82Y 30/00 |
| | | 106/404 |
| 2011/0008613 A1 | 1/2011 | Takano et al. |
| 2011/0088595 A1 | 4/2011 | Wilhelm et al. |
| 2012/0040156 A1 | 2/2012 | Ohashi et al. |
| 2012/0156451 A1 | 6/2012 | Ohashi |
| 2015/0096466 A1 | 4/2015 | Denda et al. |
| 2015/0191602 A1 | 7/2015 | Denda |
| 2015/0210859 A1 | 7/2015 | Denda et al. |
| 2016/0222242 A1 | 8/2016 | Denda et al. |
| 2017/0121550 A1 | 5/2017 | Denda |

FOREIGN PATENT DOCUMENTS

| | | |
|---|---|---|
| JP | 02-069580 A | 3/1990 |
| JP | 06-192610 A | 7/1994 |
| JP | 2001-164150 A | 6/2001 |
| JP | 2003-213157 A | 7/2003 |
| JP | 2006-169393 A | 6/2006 |
| JP | 2009-215411 A | 9/2009 |
| JP | 2011-518903 A | 6/2011 |
| JP | 2012-041378 A | 3/2012 |
| JP | 2012-131881 A | 7/2012 |
| JP | 2015-071700 A | 4/2015 |
| JP | 2015-129208 A | 7/2015 |
| JP | 2015-140359 A | 8/2015 |
| JP | 2015-164984 A | 9/2015 |

\* cited by examiner

*Primary Examiner* — Veronica F Faison

(74) *Attorney, Agent, or Firm* — Harness, Dickey & Pierce, P.L.C.

(57) ABSTRACT

An aqueous coating composition includes a base metal pigment surface-treated with a fluorinated compound, a wax and water. Particles of the base metal pigment are flake-shaped. In the aqueous coating composition, a relationship of $0.65 \leq D/Z$ is satisfied where D is an average particle diameter of the wax and Z is an average thickness of the base metal pigment.

6 Claims, No Drawings

AQUEOUS COATING COMPOSITION

BACKGROUND

1. Technical Field

The present invention relates to an aqueous coating composition.

2. Related Art

In the related art, there have been developed coating compositions containing a metallic pigment, for example, an aluminum pigment, for producing products having metal gloss. Examples of the compositions include inks and paints. Also, recently, in the development of a coating composition, in view of the global environment, ease of handling, and other factors, there is a trend toward aqueous coating compositions, which contain a water-based solvent, rather than non-aqueous coating compositions, which contain an organic-based solvent.

When a metallic pigment, particularly a base metal pigment, is used for an aqueous coating composition, there is a possibility that the metal pigment chemically reacts with, for example, the water and as a result, the inherent gloss of the base metal pigment may be lost. In view of this, JP-A-6-192610 proposes a technique for ensuring water resistance (corrosion protection properties) by causing a perfluoroalkyl phosphate ester or a perfluoroalkyl trimethylammonium salt (fluorinated compound) to be adsorbed onto the surface of a metallic aluminum pigment (base metal pigment). When a base metal pigment has water resistance, the surface thereof is inhibited from corrosion and therefore the gloss is improved.

Furthermore, JP-A-2001-164150 proposes a technique of coating (surface treating) a metallic pigment with a perfluoroalkyl-group-containing compound (fluorinated compound). By this technique, the leafing characteristic is imparted to the metallic pigment to improve the brightness (gloss) of the coating (coated article) produced using a coating composition containing the pigment. The leafing characteristic refers to a characteristic of metallic pigment particles becoming oriented along the outer surface of the coated medium.

However, coating compositions containing a base metal pigment which is surface-treated with a fluorinated compound have a problem that, when coated articles are produced by applying the coating composition to a medium to be coated, it is difficult to achieve both high gloss and high abrasion resistance. Specifically, base metal pigments, when surface-treated with a fluorinated compound, are given water and oil repellency properties. Thus, when a coating composition including the base metal pigment is applied to a medium to be coated, there is a possibility that the adhesion between the medium to be coated and the coating composition may be inhibited and thus the abrasion resistance of the coated article may decrease. That is, when a base metal pigment surface-treated as described above is used, the gloss of the coated article is improved by the leafing effect while the abrasion resistance tends to decrease. Coated articles having metal gloss can be used for applications, for example, for product packages and posters, in which high abrasion resistance, in addition to high gloss, is required. Thus, there is a need for an aqueous coating composition that achieves both the high gloss and high abrasion resistance of coated articles.

SUMMARY

An advantage of some aspects of the invention is that an aqueous coating composition that achieves both high gloss and high abrasion resistance is provided. The invention can be realized in the following forms or application examples.

Application Example 1

According to this application example, an aqueous coating composition includes a base metal pigment surface-treated with a fluorinated compound, a wax, and water. Particles of the base metal pigment are flake-shaped. In the aqueous coating composition, a relationship of $0.65 \leq D/Z$ is satisfied where D is an average particle diameter of the wax and Z is an average thickness of the base metal pigment.

According to this application example, the flake-shaped base metal pigment particles contained in the aqueous coating composition are surface-treated with a fluorinated compound. As a result, when the aqueous coating composition is applied to a medium to be coated, the base metal pigment particles become oriented along the outer surface of the coated medium (leafing occurs). Consequently, the coated article has uniform specular reflection properties, and therefore the coated article has improved gloss. Furthermore, the aqueous coating composition contains a wax, and the average particle diameter (D) of the wax and the average thickness (Z) of the base metal pigment satisfy the relationship of $0.65 \leq D/Z$. As a result, the wax protrudes, at least partially, above the surface of the coated article. As a result, when the surface of the coated article is rubbed with an object, the object contacts the protruding wax and slips, and consequently the coated article has improved abrasion resistance. Thus, the surface treatment with a fluorinated compound improves the gloss of the coated article, and also, the inclusion of the wax improves the abrasion resistance of the coated article. That is, the coating composition provided herein achieves both high gloss and high abrasion resistance of the coated article.

Application Example 2

In the aqueous coating composition according to the above application example, a content of the wax preferably ranges from greater than or equal to 0.02 mass % to less than or equal to 1.5 mass %.

Thus, the wax is contained in an amount sufficient to provide abrasion resistance and not to inhibit exhibition of gloss, and therefore both high gloss and high abrasion resistance of the coated article are achieved at a high level.

Application Example 3

In the aqueous coating composition according to the above application examples, the wax preferably includes at least one selected from polyolefin-based waxes and paraffin-based waxes.

As a result, because of the characteristics of the polyolefin-based compound and the paraffin-based compound, the abrasion resistance of the coated article is further improved. Also, these compounds have excellent abrasion resistance and therefore the contents thereof in the coating composition can be reduced. As a result, both high gloss and high abrasion resistance of the coated article are achieved at a high level.

Application Example 4

In the aqueous coating composition according to the above application examples, the base metal pigment preferably includes an aluminum pigment.

As a result of using an aluminum pigment, which is relatively low cost and has excellent gloss compared with other base metal pigments, the aqueous coating composition, which imparts excellent gloss to the coated article, can be provided at low cost.

Application Example 5

In the aqueous coating composition according to the above application examples, the average thickness of the base metal pigment preferably ranges from greater than or equal to 10 nm to less than or equal to 90 nm.

As a result, the flake-shaped base metal pigment particles have sufficient mechanical strength and therefore are inhibited from deformation while leafing occurs in an orderly manner. In addition, since the average thickness is not too large, dispersion stability of the base metal pigment is ensured. As a result, the high gloss and high quality appearance of the coated article is particularly enhanced.

Application Example 6

In the aqueous coating composition according to the above application examples, the base metal pigment preferably has an average particle diameter ranging from greater than or equal to 200 nm to less than or equal to 20.0 μm.

Thus, the base metal pigment has an average particle diameter sufficient for leafing to occur, and also, dispersion stability of the base metal pigment is ensured in the aqueous coating composition. As a result, the high gloss and high quality appearance of coated articles is particularly enhanced.

Application Example 7

The aqueous coating composition according to the above application examples is preferably an ink jet ink.

As a result, the ink jet ink, which achieves both high gloss and high abrasion resistance of the coated article, is provided.

DESCRIPTION OF EXEMPLARY EMBODIMENTS

Embodiments of the invention will be described below in detail.

An aqueous coating composition according to the present embodiment contains a base metal pigment surface-treated with a fluorinated compound, a wax, and water.

As used herein, the "aqueous coating composition" refers to a composition containing water as a solvent and which, when applied to an article, is capable of coloring the article and imparting functions to the article. The phrase "containing water as a solvent" specifically means that water is contained in an amount greater than or equal to 20 mass %. Examples of the coating composition include inks and paints.

As used herein, the term "base metal" is intended to refer to a metal having an ionization tendency greater than to hydrogen. Examples of the base metal include single metals such as alkali metals, alkaline-earth metals, Al, Fe, Zn, Pb, Ni, Co, and Cr, and alloys thereof.

The base metal pigment contained in the aqueous coating composition according to the present embodiment is made by surface-treating the pigment particles with a fluorinated compound. The pigment particles are formed of a base metal-containing material. Hereinafter, the pre-surface treatment pigment particles, which are formed of a base metal-containing material, are also referred to as "parent particles". That is, in the base metal pigment contained in the aqueous coating composition according to the present embodiment, the surface of the pigment particles (parent particles), which are formed of a base metal-containing material, are coated with a single or multiple layers that contain a fluorinated compound.

Parent Particles

First, the pigment particles (parent particles), which are formed of a base metal-containing material, will be described. With regard to the parent particles, at least some regions thereof, including the surface and near the surface, may be formed of a base metal, or the entirety thereof may be formed of a base metal.

The base metal for forming the parent particles is not particularly limited as long as the base metal falls within the definition described above. However, from the standpoint of ensuring the metal gloss and saving costs, the base metal is preferably at least one among Al, Fe, Ni, and Cr or an alloy of the base metal and a different metal, and more preferably it is Al or an Al alloy. Al or an Al alloy, when dispersed in an aqueous medium, reacts with water to generate hydrogen gas and form $Al(OH)_3$ or $Al_2O_3$, and as a result, becomes white. Thus, one problem with Al or an Al alloy is that the metal gloss will be lost because of the reaction. To address this problem, the present embodiment employs the base metal pigment, which is surface-treated with a fluorinated compound and thus has water resistance. As a result, the occurrence of the above problem is reduced.

The parent particles may be produced by any method and, for example, a preferred method is as follows. Using a vapor deposition technique, a film of a base metal is formed on one surface of a sheet-shaped substrate, and subsequently the film of the base metal is removed from the sheet-shaped substrate and subjected to grinding, to obtain flake-shaped parent particles. This method can produce flake-shaped parent particles having reduced film thickness variations and high planarity. As a result, the inherent metal gloss and other properties of the parent particles are effectively exhibited. In place of the vapor deposition technique, an ion plating or sputtering technique may be used.

Examples of the sheet-shaped substrate include plastic films such as polyethylene terephthalate films. In order to improve the removability, a release agent such as silicone oil may be previously applied to the film deposition surface of the sheet-shaped substrate, or a resin layer for removal may be previously formed on the film deposition surface. Examples of the resin that can be used for the resin layer for removal include polyvinyl alcohols, polyvinyl butyrals, polyethylene glycols, polyacrylic acids, polymethacrylic acids, polyacrylates, polymethacrylates, polyacrylamides, cellulose derivatives such as cellulose acetate butyrate, and modified nylon resins. Removal and grinding of the base metal film are performed by applying external forces, for example, irradiating the film with ultrasonic waves in an organic solvent and performing stirring using a homogenizer.

When removal and grinding are performed by a method such as described above, suitable examples of the organic solvent include: alcohols such as methanol, ethanol, propanol, and butanol; hydrocarbon compounds such as n-heptane, n-octane, decane, dodecane, tetradecane, toluene, xylene, cymene, durene, indene, dipentene, tetrahydronaphthalene, decahydronaphthalene, and cyclohexylbenzene; ether compounds such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, propylene glycol monomethyl ether acetate, 1,2-dimethoxyethane, bis(2-methoxyethyl) ether, and p-dioxane; and polar organic solvents, such as propylene carbonate, γ-butyrolactone, N-methyl-2-pyrrolidone, N,N-dimethylformamide, N,N-dimethylacetamide, dimethyl sulfoxide, cyclohexanone, and acetonitrile. The use of an organic solvent such as described above prevents, for example, undesirable oxidation of the parent particles and reduces variations in size, shape, and properties among the particles.

A preferred average particle diameter and average thickness of the parent particles are approximately equal to the average particle diameter and average thickness of the base metal pigment, which will be described later, and thus a description thereof is not provided here.

Fluorinated Compound

Next, the fluorinated compound used for the surface treatment of the parent particles will be described. As described above, the base metal pigment contained in the aqueous coating composition according to the present embodiment is a product obtained by surface treating the above-described parent particles with a fluorinated compound. Preferred examples of the fluorinated compound include fluorinated phosphonic acids, fluorinated carboxylic acids, fluorinated sulfonic acids, fluorinated silanes, and salts thereof. When any of these fluorinated compounds is used, the phosphonic acid group, the carboxy group, or the sulfonic acid group, for example, bonds to the surface of the parent particles to form the coating film, and therefore the obtained base metal pigment has water resistance. As a result, reaction between the base metal pigment and water in the aqueous medium is effectively inhibited, and furthermore, the base metal pigment exhibits excellent dispersibility. Among them, fluorinated phosphonic acids and salts thereof are more preferred because the phosphonic acid group particularly has excellent bondability to the surface of the parent particles.

Preferably, the fluorinated phosphonic acids and salts thereof have a structure represented by the following general formula (1).

[CHEM 1]

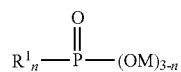

(1)

In the Formula (1), $R^1$ is a group selected from $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$, and $CF_3(CF_2)_m(CH_2)_lO-$, and M is a hydrogen atom, a monovalent metal ion, an ammonium ion or $N(-R^2)(-R^3)(-R^4)$. $R^2$, $R^3$, and $R^4$ are each independently a hydrogen atom or a $C_2H_4OH$ group provided that $R^2$, $R^3$, and $R^4$ are not all hydrogen atoms. n is an integer greater than or equal to 1 and less than or equal to 3, m is an integer greater than or equal to 1 and less than or equal to 12, and l (L) is an integer greater than or equal to 1 and less than or equal to 12.

In the Formula (1), m is an integer greater than or equal to 1 and less than or equal to 12, but preferably greater than or equal to 1 and less than or equal to 8, and more preferably greater than or equal to 1 and less than or equal to 5. Further, l (L) is an integer greater than or equal to 1 and less than or equal to 12, preferably greater than or equal to 1 and less than or equal to 10, and more preferably greater than or equal 1 and less than or equal to 6. When m and l (L) are in the preferred ranges, the above-described effects are exhibited more prominently.

The fluorinated phosphonic acid is particularly preferably a compound represented by the following general formula (2) because it provides a good balance between the ability to be adsorbed onto the surface of the parent particles and improvement in water resistance.

[CHEM 2]

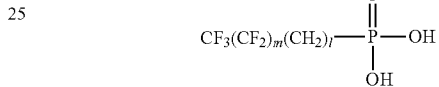

(2)

In the formula (2), m is an integer greater than or equal to 1 and less than or equal to 12, preferably greater than or equal to 1 and less than or equal to 8, and more preferably greater than or equal to 1 and less than or equal to 5. Further, l (L) is an integer greater than or equal to 1 and less than or equal to 12, preferably greater than or equal to 1 and less than or equal to 10, and more preferably greater than or equal 1 and less than or equal to 6. When m and l (L) are in the preferred ranges, the above-described effects are exhibited more prominently.

The fluorinated carboxylic acids and salts thereof preferably have a structure represented by the following general formula (3).

[CHEM 3]

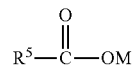

(3)

In the formula (3), $R^5$ is a group selected from $CF_3(CF_2)_m-$, $CF_3(CF_2)_m(CH_2)_l-$, and $CF_3(CF_2)_mO(CH_2)_l-$ where M is a hydrogen atom, a monovalent metal ion, or an ammonium ion. m is an integer greater than or equal to 1 and less than or equal to 12, preferably greater than or equal to 1 and less than or equal to 8, and more preferably greater than or equal to 1 and less than or equal to 5. Further, l (L) is an integer greater than or equal to 1 and less than or equal to 12, preferably greater than or equal to 1 and less than or equal to 10, and more preferably greater than or equal 1 and less than or equal to 6.

The fluorinated sulfonic acids and salts thereof preferably have a structure represented by the following general formula (4).

[CHEM 4]

(4)

In the formula (4), $R^6$ is a group selected from $CF_3(CF_2)_m-$, $CF_3(CF_2)_m(CH_2)_l-$, and $CF_3(CF_2)_mO(CH_2)_l-$ where M is a hydrogen atom, a monovalent metal ion, or an ammonium ion. m is an integer greater than or equal to 5 and less than or equal to 17, and l (L) is an integer greater than or equal to 1 and less than or equal to 12.

The fluorinated compound preferably includes at least one perfluoroalkyl group ($C_nF_{2n+1}-$) on the structure, and more preferably the perfluoroalkyl group has 1 to 6 carbon atoms. When the fluorinated compound has such a structure, the water resistance is further improved, and thus the base metal pigment, which has high metal gloss and good dispersibility, can be obtained easily.

The molecular weight of the fluorinated compound is preferably less than or equal to 1000. If the fluorinated compound to be adsorbed onto the surface of the parent particles is a fluorinated polymer such as disclosed in, for example, JP-A-2003-213157, JP-A-2006-169393, or JP-A-2009-215411, the resulting coating will have an excessively large thickness, which may result in a loss of metal gloss, and in addition, interaction between the coated pigment particles will increase, which may result in a significant decrease in dispersibility. For this reason, the film to be formed on the surface of the parent particles is preferably a monolayer film formed of a fluorinated compound having a molecular weight of less than or equal to 1000.

Base Metal Pigment

The content of the base metal pigment in the aqueous coating composition preferably ranges from greater than or equal to 0.1 mass % to less than or equal to 5.0 mass %, more preferably from greater than or equal to 0.25 mass % to less than or equal to 3.0 mass %, and particularly preferably from greater than or equal to 0.5 mass % to less than or equal to 2.5 mass %.

As a result, coated articles formed using the aqueous coating composition have both high gloss and high abrasion resistance at a high level. Furthermore, the storage stability of the aqueous coating composition and the ejection stability of the aqueous coating composition when it is used as an ink jet ink are particularly enhanced.

With regard to the shape of particles of the base metal pigment, it is preferably flake-shaped. Specifically, the ratio (R/Z) of the average particle diameter (R) of the base metal pigment to the average thickness (Z) thereof is preferably greater than or equal to 2, more preferably greater than or equal to 5, and particularly preferably greater than or equal to 8. As a result, the base metal pigment can be located over the medium to be coated, to which the aqueous coating composition is to be applied, in such a manner that the major surface of the particles conforms to the shape of the surface of the medium to be coated. Consequently, the inherent gloss and other properties of the base metal pigment are exhibited more effectively on the resulting coated article. Moreover, the abrasion resistance of the coated article is particularly enhanced.

The average thickness of the flake-shaped base metal pigment particles preferably ranges from greater than or equal to 10 nm to less than or equal to 90 nm, more preferably from greater than or equal to 15 nm to less than or equal to 85 nm, and particularly preferably from greater than or equal to 20 nm to less than or equal to 80 nm.

As a result, the above-described effects produced by the flake shape of the base metal pigment particles are exhibited more prominently.

As used herein, the "average thickness" is determined as follows. From the base metal pigment, thirty particles are randomly selected and measurements are made for each of the particles through observation with an electron microscope. Among the measured thicknesses of the 30 samples, the thicknesses of 24 samples, excluding 3 samples of greatest, second and third greatest thicknesses and 3 samples of smallest, second and third smallest thicknesses, are averaged. Examples of the electron microscope that can be used include a transmission electron microscope (TEM, "TecnaiG2F30" from FEI), a field emission scanning electron microscope (FE-SEM, "S-4700" from Hitachi High-Technologies Corporation), and a scanning transmission electron microscope (STEM, "HD-2000" from Hitachi High-Technologies Corporation).

The average particle diameter (D50) of the base metal pigment preferably ranges from greater than or equal to 200 nm to less than or equal to 20.0 μm, more preferably from greater than or equal to 300 nm to less than or equal to 10.0 μm, and even more preferably from greater than or equal to 400 nm to less than or equal to 600 nm. In particular, when the aqueous coating composition is used as an ink jet ink, the average particle diameter (D50) of the base metal pigment is preferably less than or equal to 3.0 μm.

As a result, coated articles produced using the aqueous coating composition have further enhanced gloss and high quality appearance. In addition, when used as an ink jet ink, the aqueous coating composition exhibits further enhanced storage stability and ejection stability.

As used herein, the "average particle diameter" refers to a volume median diameter based on measurement using a laser diffraction light scattering method. When the measurement results of a large number of particles are presented as abundance ratios in a cumulative manner for each size (particle diameter), the particle size corresponding to the median, 50%, in the cumulative distribution (volume average particle diameter) is designated as the "average particle diameter". Examples of the measurement instrument include Microtrac MT3000, a laser diffraction/scattering particle size distribution analyzer (from NIKKISO CO., LTD.).

In the aqueous coating composition according to the present embodiment, the base metal pigment is surface-treated, but the constituent particles of the base metal pigment may include some non-surface-treated particles. However, even in such a case, the content of the surface-treated constituent particles in the entire base metal pigment is preferably greater than or equal to 90 mass %, more preferably greater than or equal to 95 mass %, and further more preferably greater than or equal to 99 mass %. As a result, the above-described effects are exhibited more prominently.

Wax

The wax according to the present embodiment serves to impart smoothness to the surface of the coated article and improve abrasion resistance. Examples of the wax include one or a mixture of two or more selected from paraffin-based waxes such as paraffin waxes and paraffin-containing waxes, polyolefin-based waxes such as oxidized high density polyethylene waxes, polyethylene waxes, polyethylene-containing waxes, polypropylene waxes, and polypropylene-containing waxes, and resin waxes such as carnauba waxes and amide waxes. Among these, one or more selected from polyolefin-based waxes and paraffin-based waxes are preferred. These waxes are commercially available in the form of wax dispersion liquids (aqueous emulsions containing wax particles dispersed in water), and the waxes can be added as is.

Examples of commercially available wax dispersion liquids (emulsion waxes) include AQUACER 507, AQUACER 515, AQUACER 531, AQUACER 537, AQUACER 539, CERAFLOUR 990, and CERAFLOUR 995 (all are trade names of BYK Japan KK).

The aqueous coating composition according to the present embodiment satisfies the relationship of $0.65 \leq D/Z$ where $D$ is the average particle diameter of the wax and $Z$ is the average thickness of the base metal pigment. In particular, the $D/Z$ value preferably ranges from greater than or equal to 0.65 to less than or equal to 7.3, more preferably from greater than or equal to 1.0 to less than or equal to 6.0, and particularly preferably from greater than or equal to 1.8 to less than or equal to 4.9. As a result, the wax protrudes, at least partially, above the surface of the coated article produced using the aqueous coating composition. As a result, smoothness is imparted to the coated article, and thus the abrasion resistance of the coated article is improved.

The wax content in the aqueous coating composition is not particularly limited, but preferably it ranges from greater than or equal to 0.02 mass % to less than or equal to 1.5 mass %, more preferably from greater than or equal to 0.04 mass % to less than or equal to 1.0 mass %, and further more preferably from greater than or equal to 0.1 mass % to less than or equal to 0.5 mass %.

As a result, the gloss and abrasion resistance of the image formed using the aqueous coating composition are particularly enhanced. In addition, the ejection stability when the aqueous coating composition is used as an ink jet ink is particularly enhanced.

Water

The water in the aqueous coating composition serves primarily as a dispersion medium for dispersing the base metal pigment and the wax. The water is not particularly limited and may be water from which ionic impurities have been removed as much as possible. Examples of the water include pure water such as ion-exchanged water, ultrafiltrated water, reverse osmosis water, and distilled water, similar to the above-described treatment solution, and ultra-pure water. Furthermore, water sterilized by UV irradiation or addition of hydrogen peroxide, for example, may be used, and in that case, generation of mold and bacteria is inhibited in the case where the treatment solution is to be stored for a long time. As a result, the storage stability of the aqueous coating composition is further improved.

The water content in the aqueous coating composition preferably ranges from greater than or equal to 30 mass % to less than or equal to 95 mass %, more preferably from greater than or equal to 35 mass % to less than or equal to 85 mass %, and particularly preferably from greater than or equal to 40 mass % to less than or equal to 80 mass %.

Other Components

The aqueous coating composition may contain an organic solvent. The organic solvent is preferably a polar organic solvent in view of compatibility with the aqueous medium. Examples of the polar organic solvent include polyhydric alcohols, glycol ethers, and pyrrolidone derivatives.

Examples of the polyhydric alcohols include ethylene glycol, diethylene glycol, triethylene glycol, polyethylene glycol, polypropylene glycol, propylene glycol, butylene glycol, 1,2,6-hexanetriol, thioglycol, hexylene glycol, glycerine, trimethylolethane, trimethylolpropane, 1,2-butanediol, 1,2-pentanediol, 1,2-hexanediol, 1,2-heptanediol, and 1,2-octanediol.

Examples of the glycol ethers include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether.

Examples of the pyrrolidone derivatives include N-methyl-2-pyrrolidone, N-ethyl-2-pyrrolidone, N-vinyl-2-pyrrolidone, 2-pyrrolidone, and 5-methyl-2-pyrrolidone.

Components other than those described above may be added to the aqueous coating composition. Examples thereof include surfactants, tertiary amines, and pH adjusting agents.

Preferred examples of the surfactant that may be added to the aqueous coating composition include one or more selected from fluorochemical surfactants and silicon-based surfactants. The surfactant content in the aqueous medium is preferably less than or equal to 3 mass %, more preferably from 0.01 mass % to less than or equal to 2 mass %, and particularly preferably is from 0.1 mass % to less than or equal to 1 mass %. When the surfactant content is in the above ranges, the water resistance of the base metal pigment tends to be improved further.

Examples of the fluorochemical surfactant include: MEGAFACE F-430, MEGAFACE F-444, MEGAFACE F-472SF, MEGAFACE F-475, MEGAFACE F-477, MEGAFACE F-552, MEGAFACE F-553, MEGAFACE F-554, MEGAFACE F-555, MEGAFACE F-556, MEGAFACE F-558, MEGAFACE R-94, MEGAFACE RS-75, and MEGAFACE RS-72-K (all are trade names of DIC Corporation); EFTOP EF-351, EFTOP EF-352, EFTOP EF-601, EFTOP EF-801, and EFTOP EF-802 (all are trade names of Mitsubishi Materials Corporation); Ftergent 222F, Ftergent 251, and FTX-218 (all are trade names of NEOS COMPANY LIMITED); and SURFLON SC-101 and SURFLON KH-40 (all are trade names of AGC SEIMI CHEMICAL CO., LTD.).

Examples of the silicon-based surfactant include: BYK-300, BYK-306, BYK-310, BYK-320, BYK-330, BYK-344, BYK-346, BYK-UV3500, and BYK-UV3570 (all are trade names of BYK Japan KK); and KP-341, KP-358, KP-368, KF-96-50CS, and KF-50-100CS (all are trade names of Shin-Etsu Chemical Co., Ltd.).

Examples of the tertiary amine that may be added to the aqueous medium include hydroxyl amines such as triethanolamine, tripropanolamine, tributanolamine, N,N-dimethyl-2-aminoethanol, and N,N-diethyl-2-aminoethanol. Addition of a tertiary amine to the aqueous medium may improve the dispersibility of the base metal pigment because of the steric hindrance effect and pH adjusting function.

The pH adjusting agent that may be added to the aqueous coating composition is preferably one that has a buffering effect for adjusting the pH to a range of greater than 7, preferably greater than 7 and less than or equal to 10, and more preferably greater than or equal to 8 and less than or equal to 9.5. When the pH is in the range of greater than 7, the zeta potential of the base metal pigment is negative and therefore the electrostatic repulsion between the base metal pigment particles may improve the dispersibility. Examples of pH adjusting agents having such a buffering effect include Good buffers such as 4-(2-hydroxyethyl)-1-piperazine ethane sulfonic acid (HEPES), morpholino ethane sulfonic acid (MES), carbamoylmethylimino bisacetic acid (ADA), piperazine-1,4-bis(2-ethane sulfonic acid) (PIPES), N-(2-acetamide)-2-aminoethane sulfonic acid (ACES), cholamine chloride, N,N-bis(2-hydroxyethyl)-2-aminoethane sulfonic acid (BES), N-tris(hydroxymethyl)methyl-2-aminoethane sulfonic acid (TES), acetamide glycine, tricine, glycine amide, and bicine, phosphate buffer solutions, and tris buffer solutions.

The use of the aqueous coating composition according to the present embodiment is not particularly limited, and examples of the application include paints and inks. Among these, the inks are a particularly suitable application. Examples of the means for applying the ink include writing instruments, stamps, recorders, pen plotters, and ink jet printing apparatus. Among these, the use of an ink jet printing apparatus may be particularly suitable.

The viscosity of the aqueous coating composition according to the present embodiment at 20° C. preferably ranges from greater than or equal to 2 mPa·s (pascal·seconds) to less than or equal to 10 mPa·s, more preferably from greater than or equal to 2.5 mPa·s to less than or equal to 7.5 mPa·s, and particularly preferably from greater than or equal to 3 mPa·s to less than or equal to 5 mPa·s. When the viscosity of the aqueous coating composition at 20° C. is in the above ranges, the aqueous coating composition can be ejected from the nozzle in an appropriate amount. As a result, misdirection and splashing of the aqueous coating composition can be reduced further, and therefore it can be suitably used as an ink jet ink.

EXAMPLES

In the following, the invention will be described specifically by way of examples, but the invention is not limited to the examples. In the examples and comparative examples, the "parts" and "%" are on a mass basis unless otherwise specified.

Preparation of Aluminum Pigment Dispersion Liquid A

First, a polyethylene terephthalate film having a smooth surface (with a surface roughness Ra of less than or equal to 0.02 μm) was prepared.

Next, silicone oil was applied to one surface of the film over the entire area. Using a vapor deposition technique, a film constituted by aluminum (hereinafter also simply referred to as "aluminum film") was formed on the surface to which silicone oil had been applied.

Next, the film, on which the aluminum film had been formed, was placed in diethylene glycol diethyl ether and irradiated with ultrasonic waves. The aluminum film was thereby removed from the film and subjected to grinding. Next, this was fed into a homogenizer and ground for about 8 hours to obtain a dispersion liquid of plate-shaped aluminum particles (parent particles). The concentration of the aluminum particles in the dispersion liquid was 10 mass %.

Next, 100 parts by mass of diethylene glycol diethyl ether was added to 100 parts by mass of the aluminum particle-containing dispersion liquid, which had been obtained as described above, and the concentration of the aluminum particles was adjusted to 5 mass %. Subsequently, 20 parts by mass of $CF_3(CF_2)_5(CH_2)_2O(P)(OH)_2$, which is a fluorinated phosphonic acid compound, was added to the resultant liquid based on 100 parts by mass of the aluminum particles, and irradiation with ultrasonic waves was performed for 3 hours at a liquid temperature of 55° C. In this manner, the aluminum particles were surface-treated. Subsequently, the surface-treated aluminum particles were sedimented by centrifugation using a centrifuge (10000 rpm×30 min) and the supernatant was discarded. To the resultant, 1.5 mass % of a fluorochemical surfactant (from DIC Corporation, product name "MEGAFACE F-553"), 28.5 mass % of water, 65 mass % of propylene glycol were added. Further, irradiation with ultrasonic waves was performed to redisperse the surface-treated aluminum particles to obtain a dispersion liquid containing 5 mass % of the aluminum particles.

Measurements were made on the aluminum particles in the dispersion liquid using Microtrac MT3000, a laser diffraction/scattering particle size distribution analyzer (from NIKKISO CO., LTD.) under the measurement condition, "particle transmission property: reflection". It was found that the average particle diameter was 0.45 μm (450 nm). The thickness of the aluminum particles was measured by the following method using a transmission electron microscope. The dispersion liquid was applied to a silicon substrate and thereafter it was left to dry for one day. Next, cross-sectional samples of the aluminum pigment were prepared using a focused ion beam (FIB) system and the cross sections were observed using a transmission electron microscope (from FEI, TecnaiG2F30) to measure the thicknesses. Measurements were made on 30 samples, and among the measured thicknesses, the thicknesses of 24 samples, excluding 3 samples of greatest, second and third greatest thicknesses and 3 samples of smallest, second and third smallest thicknesses, were averaged to determine the average thickness. It was found that the average thickness was 20 nm.

Next, the aluminum particle-containing dispersion liquid, which had been obtained as described above, was heated to 70° C. and held at the temperature for 6 days to allow the fluorinated phosphonic acid compound to sufficiently react with the surface of the aluminum particles. In this manner, a waterproofing treatment was carried out.

Lastly, a mixture of hexylene glycol and water was added to the aluminum particle-containing dispersion liquid and stirring was performed using ultrasonic waves to obtain an aluminum pigment dispersion liquid A, which contained an aluminum pigment A.

Preparation of Aluminum Pigment Dispersion Liquid B

An aluminum pigment dispersion liquid B, which contained an aluminum pigment B, was prepared by the same procedure as that for preparing the aluminum particle dispersion liquid A except that the average particle diameter and average thickness of the aluminum particles were changed. The average particle diameter of the aluminum pigment B was 0.90 μm (900 nm) and the average thickness thereof was 30 nm.

Preparation of Aluminum Pigment Dispersion Liquid C

An aluminum pigment dispersion liquid C, which contained an aluminum pigment C, was prepared by the same procedure as that for preparing the aluminum particle dispersion liquid A except that the average particle diameter and average thickness of the aluminum particles were changed. The average particle diameter of the aluminum pigment C was 0.95 μm (950 nm) and the average thickness thereof was 83 nm.

Preparation of Aluminum Pigment Dispersion Liquid D

An aluminum pigment dispersion liquid D, which contained an aluminum pigment D, was prepared by the same procedure as that described above except that, instead of the fluorinated phosphonic acid compound, $CF_3(CF_2)_5(CH2)_2Si(OC_2H_5)_3$, which is a fluorinated silane compound, was used to surface-treat the aluminum particles. The average particle diameter of the aluminum pigment D was 0.45 μm (450 nm) and the average thickness thereof was 20 nm.

Preparation of Aluminum Pigment Dispersion Liquid E

An aluminum pigment dispersion liquid E, which contained an aluminum pigment E, was prepared by the same procedure as that for preparing the aluminum particle dispersion liquid A except that the aluminum particles were treated without using either a fluorinated phosphonic acid compound or a fluorinated silane compound. The average particle diameter of the aluminum pigment E was 0.45 μm (450 nm) and the average thickness thereof was 20 nm.

Preparation of Aqueous Ink Composition

Example 1

The aluminum pigment dispersion liquid A, which had been obtained as described above, was processed in a centrifuge to sediment the pigment by centrifugation, and the supernatant was discarded. To the resultant, the following were added: a paraffin-containing wax emulsion (from BYK Japan KK, product name "AQUACER 539", average particle diameter of 54 nm); propylene glycol and hexylene glycol serving as solvents; a surfactant (from DIC Corporation, product name "MEGAFACE F-553"); and balance water. Subsequently, irradiation with ultrasonic waves was performed to redisperse the aluminum pigment. Triethanolamine was added to the resultant to adjust the pH to 8.5. In this manner, an aqueous ink composition, which is an aqueous coating composition having the composition shown in Table 1, was obtained. From the average thickness (Z) of the aluminum pigment and the average particle diameter (D) of the wax, the D/Z of this aqueous ink composition was determined to be 2.7. The aluminum pigment and the wax were contained in the obtained aqueous ink composition. In Table 1, the symbol "-" indicates "none".

Examples 2 to 13 and Comparative Examples 1 to 4

Aqueous ink compositions were obtained in the same manner as that for Example 1 except that the types and the proportions of the materials used for preparation of the aqueous ink compositions were changed as shown in Table 1. Comparative Examples 1 and 3 did not contain a wax. The wax used in Examples 4 and 5 and Comparative Example 4 was an oxidized high density polyethylene wax emulsion (from BYK Japan KK, product name "AQUACER 515", average particle diameter of 40 nm). The wax used in Examples 6 to 8 was a polyethylene-containing wax emulsion (from BYK Japan KK, product name "AQUACER 531", average particle diameter of 146 nm).

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Base metal pigment | Al pigment A (av. particle diameter: 0.45 μm, av. thickness: 20 nm) | 1.2 | — | — | 1.2 | — | 1.2 | — | — | — |
| | Al pigment B (av. particle diameter: 0.90 μm, av. thickness: 30 nm) | — | 1.2 | — | — | 1.2 | — | 1.2 | — | — |
| | Al pigment C (av. particle diameter: 0.95 μm, av. thickness: 83 nm) | — | — | 1.2 | — | — | — | — | 1.2 | — |
| | Al pigment D (av. particle diameter: 0.45 μm, av. thickness: 20 nm) | — | — | — | — | — | — | — | — | 1.2 |
| | Al pigment E (av. particle diameter: 0.45 μm, av. thickness: 20 nm) | — | — | — | — | — | — | — | — | — |
| Wax | AQUACER 539 | 0.1 | 0.1 | 0.1 | — | — | — | — | — | 0.1 |
| | AQUACER 515 | — | — | — | 0.1 | 0.1 | — | — | — | — |
| | AQUACER 531 | — | — | — | — | — | 0.1 | 0.1 | 0.1 | — |
| Solvent | Propylene glycol | 35 | 35 | 35 | 35 | 35 | 35 | 35 | 35 | 35 |
| | Hexylene glycol | 15 | 15 | 15 | 15 | 15 | 15 | 15 | 15 | 15 |
| | 2-pyrrolidone | — | — | — | — | — | — | — | — | — |
| Surfactant | MEGAFACE F-553 | 0.35 | 0.35 | 0.35 | 0.35 | 0.35 | 0.35 | 0.35 | 0.35 | 0.35 |
| pH adjusting agent | Triethanolamine | q.s. | q.s. | q.s. | q.s. | q.s. | q.s. | q.s. | q.s. | q.s. |

TABLE 1-continued

| | | | | | | | | | | |
|---|---|---|---|---|---|---|---|---|---|---|
| Water | | bal. | bal. | bal. | bal. | bal. | bal. | bal. | bal. | bal. |
| pH | | 8.5 | 8.5 | 8.5 | 8.5 | 8.5 | 8.5 | 8.5 | 8.5 | 8.5 |
| D/Z | | 2.7 | 1.8 | 0.65 | 2.0 | 1.3 | 7.3 | 4.9 | 1.8 | 2.7 |
| Evaluation results | Gloss | A | A | A | A | A | B | A | A | A |
| | Abrasion resistance | A | A | B | A | A | A | A | A | A |

| | | Example 10 | Example 11 | Example 12 | Example 13 | Comparative Example 1 | Comparative Example 2 | Comparative Example 3 | Comparative Example 4 |
|---|---|---|---|---|---|---|---|---|---|
| Base metal pigment | Al pigment A (av. particle diameter: 0.45 μm, av. thickness: 20 nm) | 1.2 | 1.2 | 1.2 | 1.2 | 1.2 | — | — | — |
| | Al pigment B (av. particle diameter: 0.90 μm, av. thickness: 30 nm) | — | — | — | — | — | — | — | — |
| | Al pigment C (av. particle diameter: 0.95 μm, av. thickness: 83 nm) | — | — | — | — | — | — | — | 1.2 |
| | Al pigment D (av. particle diameter: 0.45 μm, av. thickness: 20 nm) | — | — | — | — | — | — | — | — |
| | Al pigment E (av. particle diameter: 0.45 μm, av. thickness: 20 nm) | — | — | — | — | — | 1.2 | 1.2 | — |
| Wax | AQUACER 539 | 0.02 | 0.5 | 1.5 | 0.1 | — | 0.1 | — | — |
| | AQUACER 515 | — | — | — | — | — | — | — | 0.1 |
| | AQUACER 531 | — | — | — | — | — | — | — | — |
| Solvent | Propylene glycol | 35 | 35 | 35 | 30 | 35 | 35 | 35 | 35 |
| | Hexylene glycol | 15 | 15 | 15 | 10 | 15 | 15 | 15 | 15 |
| | 2-pyrrolidone | — | — | — | 10 | — | — | — | — |
| Surfactant | MEGAFACE F-553 | 0.35 | 0.35 | 0.35 | 0.35 | 0.35 | 0.35 | 0.35 | 0.35 |
| pH adjusting agent | Triethanolamine | q.s. | q.s. | q.s. | q.s. | q.s. | q.s. | q.s. | q.s. |
| Water | | bal. | bal. | bal. | bal. | bal. | bal. | bal. | bal. |
| pH | | 8.5 | 8.5 | 8.5 | 8.5 | 8.5 | 8.5 | 8.5 | 8.5 |
| D/Z | | 2.7 | 2.7 | 2.7 | 2.7 | | 2.7 | | 0.48 |
| Evaluation results | Gloss | A | A | B | A | A | C | C | A |
| | Abrasion resistance | B | A | A | A | C | A | C | C |

Production of Recorded Article

Ink cartridges filled with the aqueous ink compositions were produced using dedicated cartridges for ink jet printer PX-G930 (manufactured by SEIKO EPSON CORPORATION). Next, this ink cartridge was mounted on the yellow line of the ink jet printer PX-G930, and commercially available ink cartridges were mounted on the remaining nozzles. The commercially available cartridges mounted on the lines other than the yellow line were used as dummies. The aqueous ink composition was ejected onto printing paper (a photo paper "Gloss", model number: KA450PSKR), which was a medium to be coated. Thus, a recorded article on which a solid image pattern was printed, i.e., a coated article, was obtained.

Evaluation of Recorded Article

The recorded articles obtained as described above were evaluated in the following manner.

Gloss Value

For each of the printed layers of the recorded articles of Examples and Comparative Examples, gloss value at a tilt angle of 60° was measured using a gloss meter (MINOLTA MULTI GLOSS 268), and evaluations were made in accordance with the following criteria.

A: Gloss value was greater than or equal to 250.

B: Gloss value was greater than or equal to 150 and less than 250.

C: Gloss value was less than 150.

Abrasion Resistance

When 48 hours had elapsed after the production of the recorded article, rubbing with a cloth at a load of 500 g was performed 10 times in a Gakushin-type rubbing tester in accordance with JIS L0849 to measure the gloss values (at a tilt angle of 60°) of the recorded articles after being rubbed with a cloth. The gloss value decrease percentage was determined from the pre-rubbing and post-rubbing gloss values, and evaluations were made in accordance with the following criteria.

A: Gloss value decrease percentage was less than 10%.

B: Gloss value decrease percentage was greater than or equal to 10% and less than 30%.

C: Gloss value decrease percentage was greater than or equal to 30%.

The evaluation results are shown in Table 1. From Examples 1 to 13 and Comparative Examples 1 to 3, it is seen that, when the aqueous ink composition contained wax particles and a base metal pigment surface-treated with a fluorinated compound (Examples 1 to 13), the gloss evaluation and the abrasion resistance evaluation were both at least B, which demonstrates that both high gloss and high abrasion resistance were achieved. On the other hand, when the aqueous ink composition did not contain a wax (Comparative Examples 1 and 3), the abrasion resistance evaluation was C. Furthermore, when the aqueous ink composition did not contain a base metal pigment surface-treated with a fluorinated compound but contained a non-surface-treated base metal pigment (Comparative Example 2), the gloss evaluation was C. That is, it is seen that Comparative Examples 1 to 3 did not achieve both high gloss and high abrasion resistance.

From Examples 1 to 13 and Comparative Example 4, it is seen that, when the D/Z value was greater than or equal to 0.65 (Examples 1 to 13), the gloss evaluation and the abrasion resistance evaluation were both at least B, and therefore both high gloss and abrasion resistance were achieved. On the other hand, it is seen that, when the D/Z value was not greater than or equal to 0.65 (Comparative Example 4), the abrasion resistance evaluation was C, and therefore Comparative Example 4 did not achieve both high gloss and high abrasion resistance.

From Examples 1 to 8, it is seen that, when the D/Z values were 1.3 (Example 5), 1.8 (Examples 2 and 8), 2.0 (Example 4), 2.7 (Example 1), or 4.9 (Example 7), the gloss evaluation and the abrasion resistance evaluation were both A, and therefore both high gloss and high abrasion resistance were achieved at a high level.

From Examples 1 and 10 to 12, it is seen that, when the wax particle content in the aqueous ink composition was 0.1 mass % (Example 1) or 0.5 mass % (Example 11), the gloss evaluation and the abrasion resistance evaluation were both A, and therefore both high gloss and high abrasion resistance were achieved at a high level.

The entire disclosure of Japanese Patent Application No. 2016-151772, filed Aug. 2, 2016 is expressly incorporated by reference herein.

What is claimed is:
1. An aqueous coating composition comprising:
a base metal pigment surface-treated with a fluorinated compound, particles of the base metal pigment being flake-shaped;
wax particles; and
water,
wherein a content of the wax particles is in the range of 0.02 mass % to 1.5 mass %,
a content of the water is equal to or greater than 30 mass %, and
a relationship of $0.65 \leq D/Z$ is satisfied where D is an average particle diameter of the wax and Z is an average thickness of the base metal pigment.
2. The aqueous coating composition according to claim 1, wherein the wax particles include at least one selected from polyolefin-based waxes and paraffin-based waxes.
3. The aqueous coating composition according to claim 1, wherein the base metal pigment includes an aluminum pigment.
4. The aqueous coating composition according to claim 1, wherein the average thickness of the base metal pigment ranges from greater than or equal to 10 nm to less than or equal to 90 nm.
5. The aqueous coating composition according to claim 1, wherein the base metal pigment has an average particle diameter ranging from greater than or equal to 200 nm to less than or equal to 20.0 μm.
6. The aqueous coating composition according to claim 1, wherein the aqueous coating composition is an ink jet ink.

* * * * *